United States Patent
Zhou et al.

(10) Patent No.: US 11,907,905 B2
(45) Date of Patent: Feb. 20, 2024

(54) NAMESPACE MANAGEMENT TECHNIQUES FOR FACILITATING MULTI-CLUSTER APPLICATION DEVELOPMENT

(71) Applicant: VMware LLC, Palo Alto, CA (US)

(72) Inventors: Long Zhou, Renton, WA (US); Fabio Yeon, Mill Creek, WA (US); Kyoung Won Kwon, Bellevue, WA (US); Pranav Sandeep Vaidya, Bellevue, WA (US); Dhanashree Hemachandra Adhikari, Bothell, WA (US); Eryn Muetzel, Seattle, WA (US); Suresh Chellappan, Bothell, WA (US)

(73) Assignee: VMware LLC, Palo Alto, CA (US)

( * ) Notice: Subject to any disclaimer, the term of this patent is extended or adjusted under 35 U.S.C. 154(b) by 33 days.

(21) Appl. No.: 16/837,669

(22) Filed: Apr. 1, 2020

(65) Prior Publication Data
US 2021/0312392 A1    Oct. 7, 2021

(51) Int. Cl.
*G06Q 10/101*    (2023.01)
*G06Q 10/0631*   (2023.01)
*G06Q 10/105*    (2023.01)
*H04L 9/40*      (2022.01)

(52) U.S. Cl.
CPC ..... *G06Q 10/101* (2013.01); *G06Q 10/06311* (2013.01); *G06Q 10/105* (2013.01); *H04L 63/20* (2013.01)

(58) Field of Classification Search
CPC .............. G06Q 10/101; G06Q 10/105; G06Q 10/06311; H04L 63/20
See application file for complete search history.

(56) References Cited

U.S. PATENT DOCUMENTS

| | | |
|---|---|---|
| 9,639,338 B2 | 5/2017 | Ruehl et al. |
| 10,361,917 B1 | 7/2019 | Parthasarathy et al. |
| 10,467,241 B2 | 11/2019 | Thayer et al. |

(Continued)

OTHER PUBLICATIONS

Related to Granted U.S. Appl. No. 16/848,725; Non-Final Office Action dated Apr. 14, 2020.

(Continued)

*Primary Examiner* — Suraj M Joshi
*Assistant Examiner* — Jaren Means
(74) *Attorney, Agent, or Firm* — Quarles & Brady LLP

(57) ABSTRACT

Techniques for managing namespaces in a multi-cluster management (MCM) system to facilitate multi-cluster application development are provided. In one set of embodiments, a computer system executing the MCM system can create a workspace for an application being developed by a software development team of an organization, where the workspace is a logical grouping of namespaces on which the application has been or will be deployed, and where at least a subset of the namespaces can belong to different clusters of the organization. The computer system can then assign a member of the development team as a workspace administrator of the workspace, thereby enabling that development team member to perform management tasks on the workspace and its member namespaces via the MCM system (e.g., creating and adding namespaces to the workspace, setting access/image/network policies on the workspace, etc.), without help from the organization's IT staff.

15 Claims, 7 Drawing Sheets

(56) References Cited

U.S. PATENT DOCUMENTS

| | | | |
|---|---|---|---|
| 10,469,318 B1 | 11/2019 | Parthasarathy et al. | |
| 10,965,752 B1 | 3/2021 | Smith | |
| 11,080,041 B1 | 8/2021 | Ah Kun et al. | |
| 2005/0091346 A1* | 4/2005 | Krishnaswami | H04L 41/0894 719/310 |
| 2008/0301175 A1* | 12/2008 | Applebaum | G06F 16/24565 707/999.102 |
| 2010/0023937 A1 | 1/2010 | Kothari et al. | |
| 2010/0049637 A1 | 2/2010 | Laventman et al. | |
| 2010/0114618 A1 | 5/2010 | Wilcock et al. | |
| 2010/0115490 A1 | 5/2010 | Wilcock et al. | |
| 2010/0250608 A1 | 9/2010 | Malviya et al. | |
| 2011/0213870 A1 | 9/2011 | Cai et al. | |
| 2013/0282994 A1* | 10/2013 | Wires | G06F 3/0604 709/212 |
| 2014/0101178 A1 | 4/2014 | Ginter | |
| 2015/0058484 A1 | 2/2015 | Mehta et al. | |
| 2015/0215376 A1 | 7/2015 | Kranz et al. | |
| 2015/0278311 A1* | 10/2015 | Isherwood | G06F 16/13 707/741 |
| 2015/0309780 A1 | 10/2015 | Ruehl et al. | |
| 2018/0046951 A1 | 2/2018 | Mohindra et al. | |
| 2018/0107679 A1 | 4/2018 | Arneja et al. | |
| 2018/0198868 A1 | 7/2018 | Klaghofer et al. | |
| 2018/0278675 A1 | 9/2018 | Thayer et al. | |
| 2018/0367363 A1 | 12/2018 | Jaeger | |
| 2019/0222988 A1 | 7/2019 | Maes et al. | |
| 2019/0235775 A1 | 8/2019 | Zwiegincew et al. | |
| 2019/0384835 A1 | 12/2019 | Luo et al. | |
| 2020/0019622 A1 | 1/2020 | Lu et al. | |
| 2020/0076685 A1* | 3/2020 | Vaidya | H04L 61/3015 |
| 2020/0193043 A1 | 6/2020 | Hoehmann et al. | |
| 2020/0304599 A1* | 9/2020 | Kanso | G06F 8/36 |
| 2020/0348918 A1 | 11/2020 | Giannetti et al. | |
| 2020/0379816 A1 | 12/2020 | Lin et al. | |
| 2021/0042314 A1 | 2/2021 | Batlle et al. | |
| 2021/0075693 A1 | 3/2021 | Su et al. | |
| 2021/0084103 A1 | 3/2021 | Smith | |
| 2021/0185125 A1 | 6/2021 | Smith | |
| 2021/0200814 A1* | 7/2021 | Tal | G06F 16/90335 |
| 2021/0318913 A1 | 10/2021 | Moyer et al. | |
| 2021/0318914 A1 | 10/2021 | Moyer et al. | |
| 2022/0043692 A1 | 2/2022 | Moyer et al. | |
| 2022/0058285 A1 | 2/2022 | Trenholm et al. | |

OTHER PUBLICATIONS

Related to Granted U.S. Appl. No. 16/848,725; Notice of Allowance dated Jul. 26, 2021.

Related to pending U.S. Appl. No. 17/510,178; Non-Final Office Action dated Jun. 8, 2022.

Related to pending U.S. Appl. No. 16/848,757; Non-Final Office Action dated Jun. 14, 2022.

E. Yang, Y. Zhang, L. Wu, Y. Liu and S. Liu, "A Hybrid Approach to Placement of Tenants for Service-Based Multi-tenant Saas Application," 2011 IEEE Asia-Pacific Services Computing Conference, Jeju, Korea (South), 2011, pp. 124-130, doi: 10.1109/APSCC.2011.35. (Year: 2011).

C. Fehling, F. Leymann, D. Schumm, R. Konrad, R. Mietzner and M. Pauly, "Flexible Process-Based Applications in Hybrid Clouds", 2011 IEEE 4th International Conference on Cloud Computing, Washington, DC, USA, 2011, pp. 81-88, doi: 10.1109/CLOUD.2011.37. (Year: 2011).

T. Kwok, T. Nguyen and L. Lam, "A Software as a Service with Multi-tenancy Support for an Electronic Contract Management Application", 2008 IEEE International Conference on Services Computing, Honolulu, HI, USA, 2008, pp. 179-186, doi: 10.1109/SCC .2008.138. (Year: 2008).

Mixed-Tenancy Systems—A hybrid Approach between Single and Multi-Tenancy Aug. 2014 Edition: 1Publisher: Dr. Hu!ISBN: 9783843916646 Authors: Stefan T. Ruehl (Year: 2014).

"Ingress", https://kubernetes.io/docs/concepts/servicesnetworking/ingress; Mar. 31, 2020.

"Extending you Kubernetes Cluster", URL https://kubernetes.io/docs/concepts/extend-kubernetes/api-extension/custom-resources; Nov. 20, 2018.

"Amazon RDS Multi-AZ deployments"; https://aws.amazon.com/rds/details/multi-az; downloaded May 4, 2020.

Bobby Tables, "Dynamic Kubernetes Informers", https://www.firehydrant.io/blog/dynamic-kubernetes-informers/; Aug. 28, 2019.

"Pod Overview", https://kubernetes.io/docs/concepts/workloads/pods/podoverview/; Apr. 21, 2020.

Colm MacCárthaigh, "Workload isolation using shuffle-sharding", 2019. https://aws.amazon.com/builders-library/workload-isolation-using-shuffle-sharding/; downloaded May 4, 2020.

Reuven Krebs, Chrislof Momm, and Samuel Kounev. Architectural concerns in multi-tenant saas applications. Closer, 12:426-431, Apr. 2012.

URL https://cloud.vmware.com/lanzu-mission-conlrol; downloaded May 4, 2020.

Amazon elastic compute cloud {amazon ec2), 2020. URL https://aws.amazon.com/ec2/; downloaded May 5, 2020.

Kubemeles, 2020. URL https://kubemeles.io/; downloaded May 1, 2020.

Envoy proxy, 2020. URL https:/lwww.envoyproxy.io; downloaded May 1, 2020.

James C Corbell, Jeffrey Dean, Michael Epstein, Andrew Fikes, Christopher Frost, Jeffrey John Furman, Sanjay Bhemawal, Andrey Gubarev, Christopher Heiser, Peter Hochschild, et al. Spanner: Google's globally distributed : Database. ACM Transactions on Computer Systems, vol. 31, No. 3, Article 8, Publication dale: Aug. 2013.

Giuseppe Decandia et al., "Dynamo: amazon's highly available key-value store", ACM SIGOPS operating systems eview, 41 (6):205-220, Oct. 2004.

Craig D Weissman et al., "The Design of the Force.com Multitenant Internet Application Development Platform", In Proceedings of the 2009 ACM SIGMOD International Conference on Management of data, pp. 889-896, Jun. 29, 2009.

How we took our server side application to the cloud and liked what we got, hllps://www.slideshare.net/DevopsCon/how-we-look-our-server-sideapplicalion-lo-lhe-cloud-and-liked-what-we-got-16237021; Jan. 29, 2013.

Mike Arpaia, Using a Kubernetes Operator to Manage Tenancy in a B2B Saa app; https://blog.kolide.com/using-a-kubernetes-operator-to-managetenancy-in-a-b2b-saas-app-250f1 c9416ce, May 15, 2018.

Howard Yoo, "Wavefront Architecture", https://confluence.eng.vmware.com/display/PS/Wavefronl+Archilecture; Oct. 29, 2019.

Sanjeev Rampal et al., https://github.com/kubernetes/community/tree/master/wgmultitenancy; downloaded May 4, 2020.

Consistent Infrastructure Consistent Operations, https://cloud.vmware.com; downloaded May 4, 2020.

\* cited by examiner

NAMESPACE MANAGEMENT TECHNIQUES FOR FACILITATING MULTI-CLUSTER APPLICATION DEVELOPMENT

BACKGROUND

Kubernetes is an open-source software platform for orchestrating the deployment, scheduling, and scaling of containerized applications (i.e., software applications whose program code and dependencies are packaged into a standardized format, known as a container image, that can be uniformly run in different computing environments). A Kubernetes cluster is a group of physical or virtual machines on which an instance of the Kubernetes platform and the containerized applications it orchestrates are placed and run.

For high availability and other reasons, it is becoming increasingly common for organizations to develop containerized applications that are deployed across multiple Kubernetes clusters rather than on a single cluster. The development of such an application (referred to herein as a "multi-cluster application") involves, among other things, the creation of a namespace for the application in each target cluster (which provides a unique resource/object scope for the application within that cluster), and the setting of certain policies on those namespaces (which allows, for example, the application's development team members to access the namespaces and deploy their application objects therein).

However, existing systems for managing an organization's Kubernetes clusters (referred to herein as "multi-cluster management (MCM) systems") generally do not permit the organization's developers to create namespaces or set namespace policies on their own, as these are traditionally considered infrastructure tasks to be carried out by information technology (IT) staff. In addition, such existing systems generally do not provide a mechanism for efficiently managing arbitrary groups of namespaces that may belong to different Kubernetes clusters. As a result, if a development team is developing a multi-cluster application that requires, e.g., the creation of five new namespaces in five different clusters and the setting of a particular access policy on those five namespaces, the development team must submit one or more support requests to the IT department and wait for a response. An IT staff member assigned to the request(s) must then create the five namespaces and set the correct access policy on each individual namespace on behalf of the development team, which is an inefficient and error-prone process.

DETAILED DESCRIPTION

Figure 1:
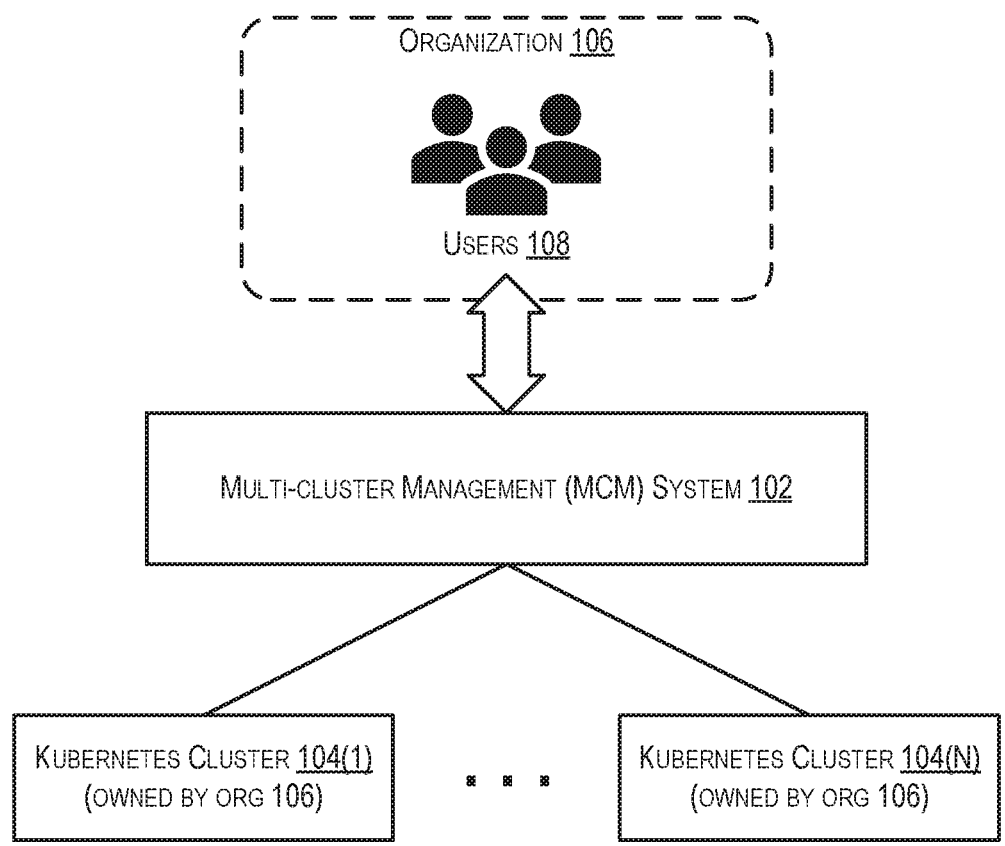
FIG. 1 depicts an example operating environment according to certain embodiments.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques that can be implemented by a multi-cluster management (MCM) system for managing groups of namespaces in an organization in a manner that streamlines the organization's development of multi-cluster applications. As used herein, a "namespace" is a logical entity that provides a unique scope for resources and objects in a Kubernetes cluster, such that any resources/objects residing in a particular namespace will not be accessible from the context of other namespaces in the same cluster. Accordingly, namespaces can be understood as a mechanism for sharing a Kubernetes cluster among multiple tenants or use cases in a way that prevents one tenant/use case's actions from interfering with the cluster settings and environment of another.

At a high level, the techniques of the present disclosure are based on the novel concept of a "workspace," which is a logical grouping of namespaces that may include namespaces from any Kubernetes cluster of an organization (e.g., a first namespace N1 from a cluster C1, a second namespace N2 from another cluster C2, and so on). When a development team of the organization is tasked with creating a multi-cluster application to be deployed across the organization's Kubernetes clusters, the MCM system can create and assign a workspace for the application to that development team. The development team can then use self-service workflows provided by the MCM system to, e.g., create new namespaces in the organization's various clusters for its application, add the created namespaces to the workspace, and set various policies on the workspace (which will be automatically propagated to each member namespace), all without any, or with only minimal, assistance from IT. Thus with these techniques, the inefficiencies and other issues inherent in managing namespaces for multi-cluster application development using existing MCM systems (such as the need for developers to ask IT staff to perform namespace-related operations on their behalf and the inability to manage namespaces across clusters as a single logical unit) can be avoided.

The foregoing and other aspects of the present disclosure are described in further detail below. It should be noted that while the present disclosure focuses on Kubernetes and Kubernetes clusters for ease of explanation, the same concepts may be applied to facilitate cross-cluster namespace management with respect to any other type of container orchestration platform that supports namespaces (or a substantially similar construct). Accordingly, all references to "Kubernetes" herein may be substituted with the more generic term "container orchestration platform."

2. Example Operating Environment and Solution Architecture

FIG. 1 depicts an example operating environment 100 comprising an MCM system 102 in which embodiments of the present disclosure may be implemented. As shown, MCM system 102 is communicatively coupled with a number of Kubernetes clusters 104(1)-(N) that are owned by an organization 106. Further, MCM system 102 is accessible by a set of users 108 in organization 106 for carrying out various management tasks with respect to clusters 104(1)-(N), such as managing cluster and namespace lifecycles, setting cluster-level and namespace-level features and policies, and so on.

In one set of embodiments, MCM system 102 may be deployed on one or more physical or virtual machines that are located on-premises with respect to organization 106, such as at a data center that is owned and operated by the organization. In other embodiments, MCM system 102 may be hosted in a public or private cloud and maintained by, e.g., a third-party SaaS (Software-as-a-Service) provider. Similarly, each Kubernetes cluster 104 may be deployed on-premises with respect to organization 106 or hosted off-premises in a public or private cloud environment.

For discussion purposes, assume that a development team T of organization 106 is tasked with creating a multi-cluster application A which will be deployed across clusters 104(1)-(N) for, e.g., high availability, low end-user latency, and/or other reasons. As noted in the Background section, in this scenario there is a need for development team T to (1) create an application-specific namespace for A in each cluster, as that will provide a unique resource/object scope for A which is isolated from other applications/tenants in the same cluster, and (2) set various policies on those namespaces (e.g., access, image, and network policies) that are pertinent to the development and/or operation of A.

Figure 2:
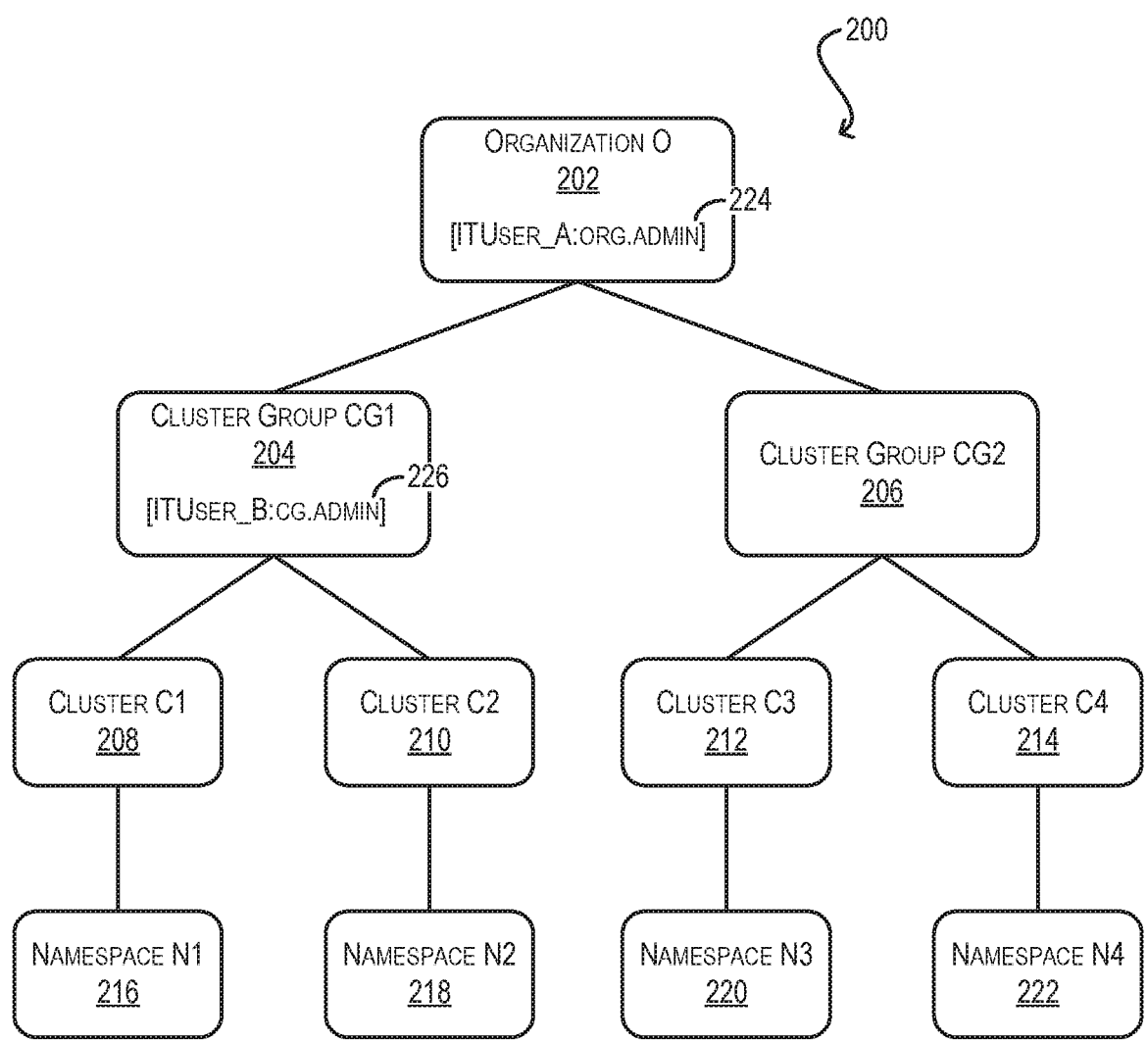
FIG. 2 depicts a conventional multi-cluster management (MCM) data model.

However, existing MCM systems are not designed to efficiently support (1) and (2). To explain why this is the case, FIG. 2 is a simplified block diagram of a MCM data model 200 that is conventionally used by such existing systems for representing the cluster infrastructure of an organization and tracking how organizational users map to the organization's infrastructure resources for management access/control. In this example, the organization (i.e., "organization O") includes four Kubernetes clusters C1, C2, C3, and C4 that are part of two cluster groups CG1 and CG2. Cluster groups CG1 and CG2 may correspond to different business units in organization O or any other logical grouping of clusters used by the organization. In addition, each cluster C1/C2/C3/C4 includes a corresponding namespace N1/N2/N3/N4.

As shown in FIG. 2, MCM data model 200 is organized according to a tree hierarchy in which organization O is represented by a first-level (i.e., root) organization node 202, cluster groups CG1 and CG2 are represented by second-level cluster group nodes 204 and 206 directly below organization node 202, clusters C1-C4 are represented by third-level cluster nodes 208-214 directly below their respective cluster group nodes 204/206, and namespaces N1-N4 are represented by fourth-level (i.e., leaf) namespace nodes 216-222 directly below their respective cluster nodes 208-214. Further, various IT staff members of organization O are bound to security roles at certain nodes of MCM data model 200, thereby granting those IT staff members authority to carry out management tasks associated with the security roles for those respective nodes/resources (as well as for all descendant nodes/resources in the hierarchy). For example, an IT staff member named "IT_UserA" is bound to an organization administrator ("org.admin") security role via a user-role binding 224 ("[IT_UserA:org.admin]") at organization node 202, which indicates that IT_UserA is authorized to perform all of the management tasks enabled by this role with respect to organization O and the descendant resources of O in the hierarchy (i.e., cluster groups CG1 and CG2, clusters C1-C4, and namespaces N1-N4). In addition, an IT staff member named "IT_UserB" is bound to a cluster group administrator ("cg.admin") security role via a user-role binding 226 ("[IT_UserB:cg.admin]") at cluster group node 204, which indicates that IT_UserB is authorized to perform all of the management tasks enabled by this role with respect to cluster group CG1 and the descendant resources of CG1 in the hierarchy (i.e., clusters C1 and C2 and namespaces N1 and N2).

The problems with employing a conventional MCM data model like model 200 of FIG. 2 in the context of the previously-mentioned scenario of development team T/multi-cluster application A are twofold: first, because only IT staff members are assigned and bound to security roles in the MCM data model for the purposes of enabling infrastructure management, it is not possible for development team T to independently create and manage namespaces for multi-cluster application A; instead, development team T must request help from the IT staff member(s) that have the appropriate roles/permissions assigned to them via the data model, and those IT staff member(s) must then perform the tasks on behalf of team T, which is time-consuming and inefficient.

Second, because organizational users can only carry out management tasks that align with the rigid organization-→cluster groups→clusters→namespaces hierarchy shown in FIG. 2, it is not possible for users to operate on namespaces that belong to different Kubernetes clusters as a single logical unit. Thus, for instance, if a given access policy needs to be applied to N namespaces that each belong to a different cluster, this cannot be achieved via a single operation. Instead, the access policy must be applied to each of the N namespaces individually, which is burdensome and prone to errors.

Figure 3:
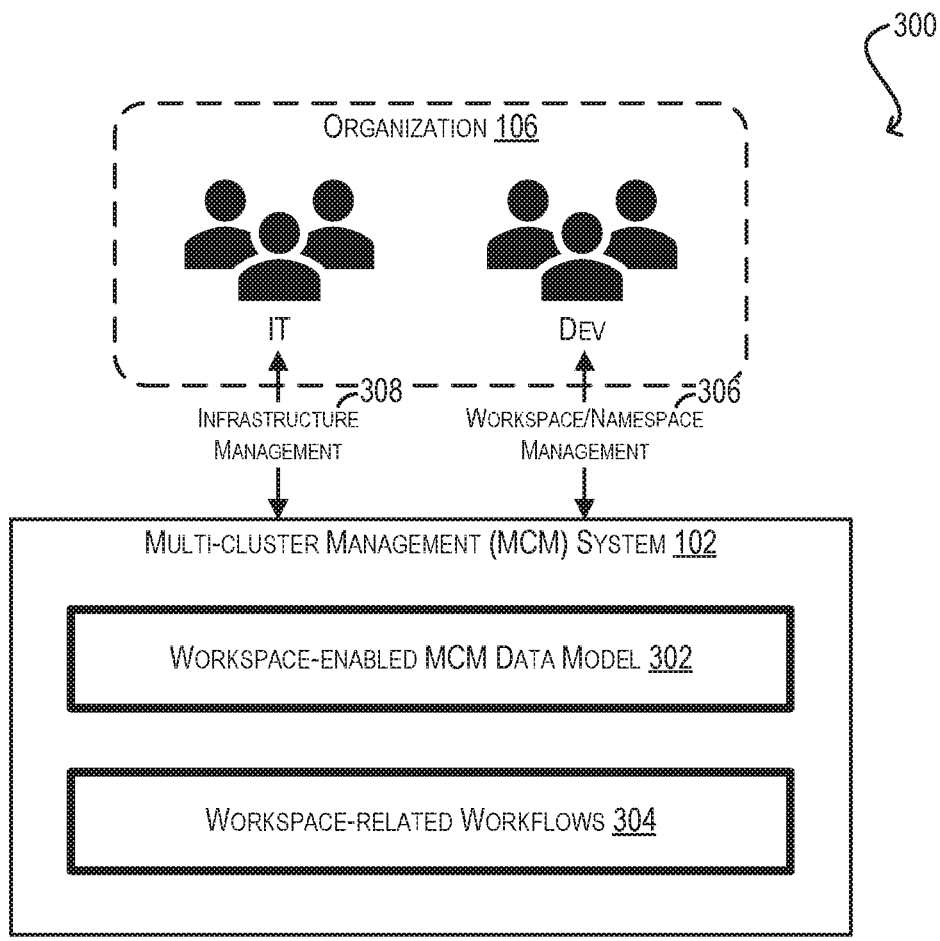
FIG. 3 depicts an architecture for an MCM system according to certain embodiments.

To address the foregoing and other similar issues, FIG. 3 depicts an architecture 300 for MCM system 102 of FIG. 1 that includes a novel workspace-enabled MCM data model 302 and a series of related workflows 304. In various embodiments, workspace-enabled MCM data model 302 can include a hierarchy of infrastructure (e.g., organization, cluster group, cluster, and namespace) nodes that is similar to conventional MCM data model 200 of FIG. 2. However, in addition to these infrastructure node types, workspace-enabled MCM data model 302 can include a new "workspace" node type, where a workspace is a logical grouping of namespaces that can belong to any of an organization's clusters. Further, workspace-enabled MCM data model 302 can allow the binding of an organization's development team members to security roles at workspace nodes.

Figure 4:
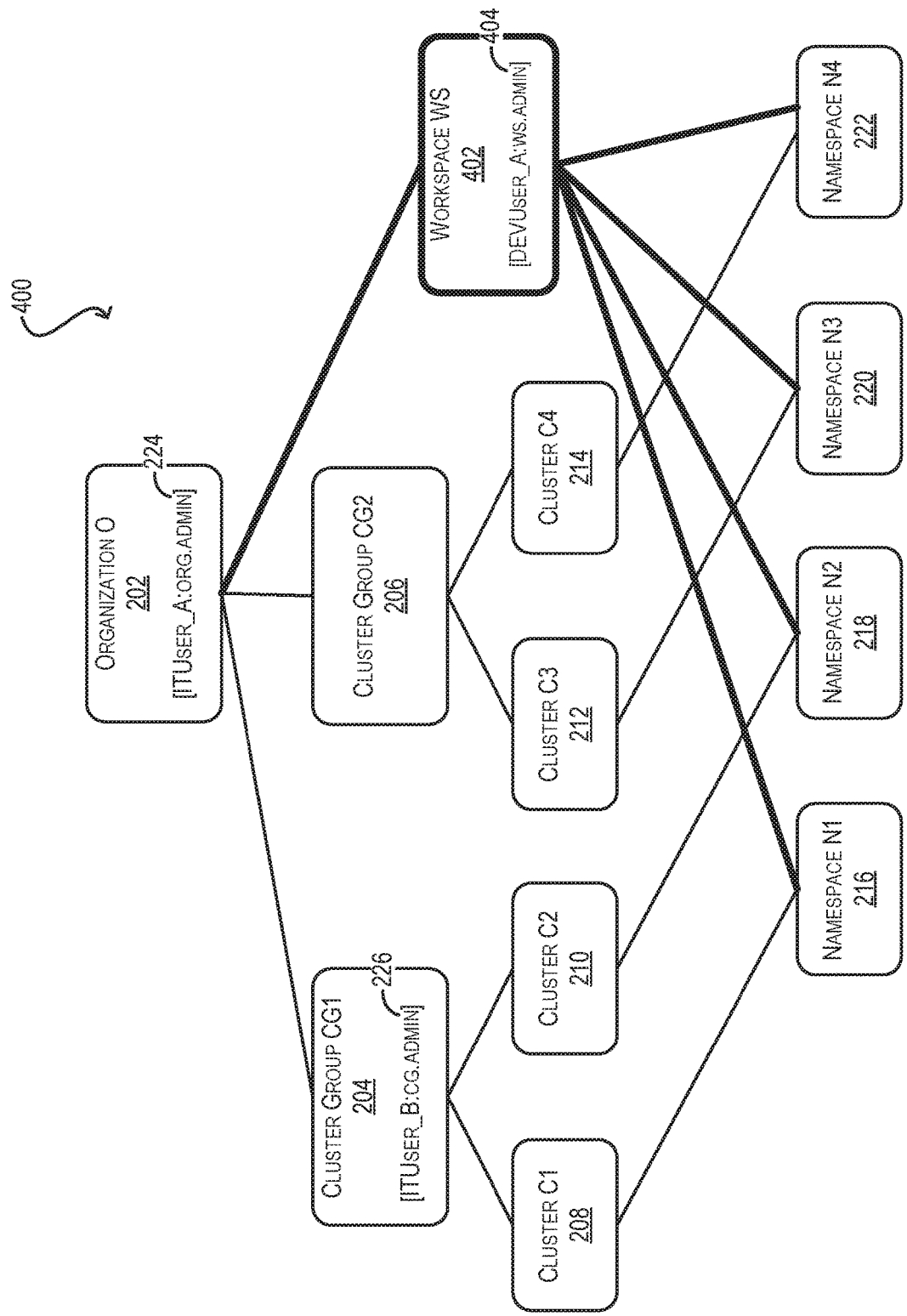
FIG. 4 depicts a workspace-enabled MCM data model according to certain embodiments.

By way of example, FIG. 4 depicts a workspace-enabled version (400) of conventional MCM data model 200 of FIG. 2. As shown in FIG. 4, workspace-enabled version 400 includes a new workspace node 402 under organization node 202 that groups together namespaces N1-N4 across disparate clusters C1-C4 into a single management entity (i.e., "workspace WS"). In addition, a development team member "DEV_UserA" is bound to a workspace administrator ("ws.admin") security role via a user-role binding 404 ("[DEV_UserA:ws.admin]") at workspace node 402, indicating that DEV_UserA can perform management tasks enabled by this role (which may include, e.g., adding/removing namespaces to the workspace, applying policies, etc.) with respect to workspace WS and its child/member namespaces N1, N2, N3, and N4.

With workspace-enabled MCM data model 302 in place, at the time previously-discussed development team T of organization 106 initiates development of multi-cluster application A, (1) a new workspace for A (e.g., "workspace WS_A") can be created and added, in the form of a workspace node, to data model 302, and (2) a member of development team T, such as a team lead or manager, can be assigned as an administrator of workspace WS_A by defining and attaching an appropriate user-role binding for that development team member to WS_A's node in the data model. Then, as work on multi-cluster application A progresses, the workspace administrator can, e.g., create and add new namespaces to workspace WS_A, set access/image/network policies on WS_A, and carry out other workspace/namespace-related management tasks with respect to WS_A via workflows 304 of MCM system 102.

Significantly, because the workspace administrator is granted authority to manage workspace WS_A via workspace-enabled MCM data model 302, the workspace administrator does not need to request help from the organization's IT staff in order to carry out these tasks; instead, the workspace administrator (and thus development team T) can execute the tasks in a mostly independent, self-service manner (shown via reference numeral 306). At the same time, because the workspace administrator's management authority extends only to workspace WS_A and its member namespaces, the workspace administrator is prevented from making changes to organization 106's cluster infrastructure (e.g., cluster groups and clusters), which remain the domain of the IT department (shown via reference numeral 308).

Further, because workspaces can group together namespaces from different Kubernetes clusters (which is not possible via the infrastructure hierarchy of conventional MCM data model 200), any namespace policies or features that are applied to workspace WS_A will be automatically applied to all member namespaces, regardless of which clusters those member namespaces belong to. This advantageously ensures consistent, correct, and timely application of those features/policies across all of the member namespaces.

The remaining sections of the present disclosure provide additional details regarding the various workspace-related workflows 304 that may be supported by MCM system 102 of FIG. 3, including workflows for creating a new workspace, creating and adding a namespace to a workspace, and setting an access policy on a workspace. It should be appreciated that FIGS. 1-4 are illustrative and not intended to limit embodiments of the present disclosure. For example, although FIG. 1 depicts only a single organization 106 using MCM system 102, in other embodiments multiple organizations may rely on system 102 in order to manage their respective Kubernetes cluster fleets. In these embodiments, MCM system 102 can maintain a separate workspace-enabled MCM data model for each organization.

Further, although workspace-enabled MCM data model 400 shown in FIG. 4 depicts only a single workspace for illustration, the embodiments of the present disclosure can support any number of workspaces in an organization's data model. For an organization with a large and multi-layered development org structure, the organization's workspaces may be arranged in a nested fashion, such that some workspaces are created as children of other workspaces in the data model hierarchy. This can enable, e.g., the workspace administrator of a parent workspace to manage all of the namespaces in its descendant workspaces, as well as create new workspaces under that parent workspace.

3. Workspace Creation

Figure 5:
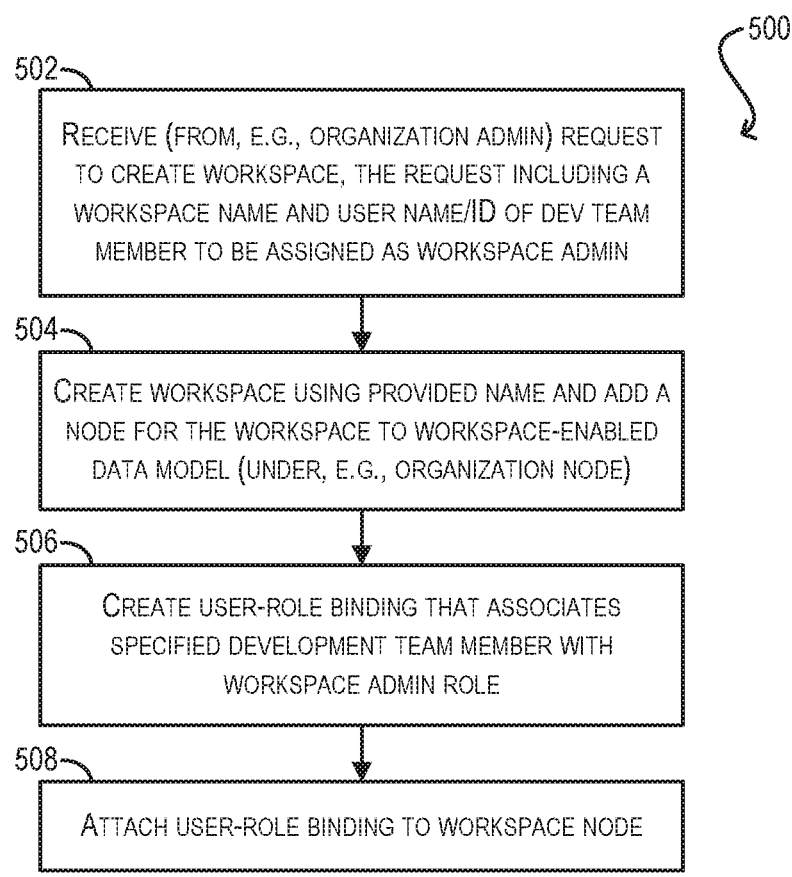
FIG. 5 depicts a workflow for creating a workspace according to certain embodiments.

FIG. 5 depicts a workspace creation workflow 500 that may be implemented by MCM system 102 of FIG. 3 with respect to organization 106 according to certain embodiments. Workflow 500 can be initiated by an organization administrator or some other user within organization 106 that has the authority to create and add new workspaces to the organization's workspace-enabled MCM data model 302.

Starting with block 502, MCM system 106 can receive (from, e.g., the organization administrator) a request to create a new workspace for a containerized application to be developed by a development team of organization 106, where the request includes information such as the workspace name and the user name/ID of a development team member that will be assigned as the administrator of the workspace.

In response, MCM system 102 can create the workspace using the provided name and add a node for the newly created workspace to workspace-enabled MCM data model 302 (under, e.g., the root-level organization node) (block 504). Note that because no namespaces have been added to this workspace yet, the workspace node will not be initially linked to any namespaces in data model 302.

In addition, at block 506, MCM system 102 can create a user-role binding that associates the development team member specified in the workspace creation request to a workspace administrator security role. This role can include permissions for, e.g., editing a workspace, adding/editing/removing namespaces on the workspace, applying access/image/network policies to the workspace and its member namespaces, and others.

Finally, at block 508, MCM system 102 can attach the user-role binding to the workspace node added at block 504, thereby granting that development team member all of the permissions in the workspace administrator role for the newly created workspace.

4. Creating and Adding a Namespace to a Workspace

Figure 6:
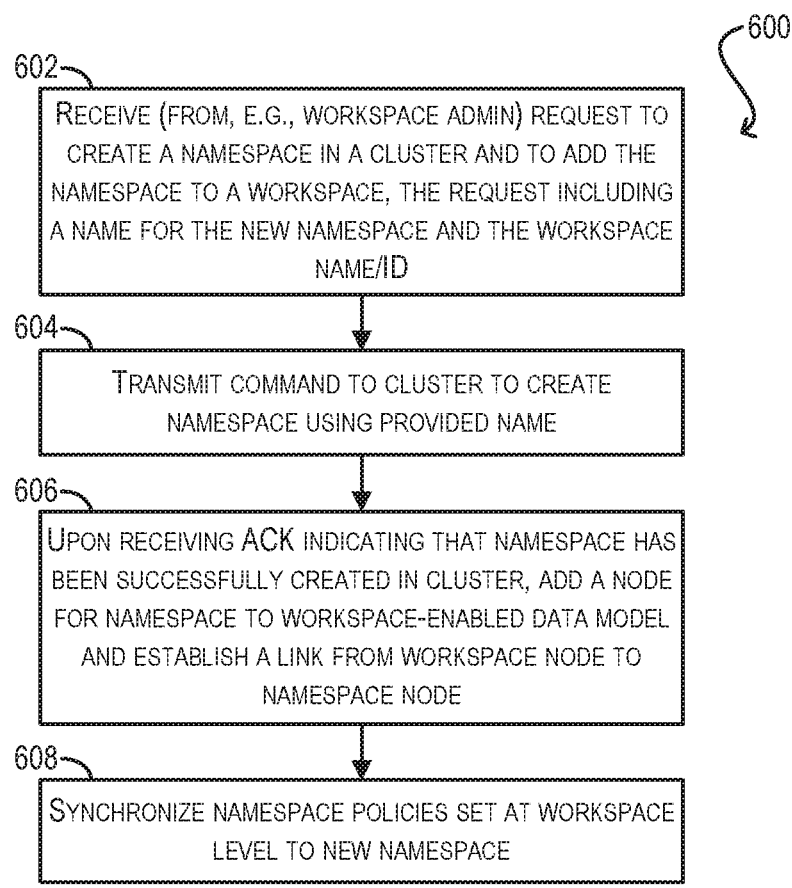
FIG. 6 depicts a workflow for creating and adding a namespace to a workspace according to certain embodiments.

FIG. 6 depicts a workflow 600 that may be implemented by MCM system 102 of FIG. 3 for creating a new namespace in a Kubernetes cluster 104 of organization 106 and adding that namespace to a workspace according to certain embodiments. Workflow 600 assumes that a workspace administrator has been assigned to the workspace per workflow 500 of FIG. 5. Workflow 600 also assumes that the workspace administrator has been granted authority to create namespaces in cluster 104 (via, e.g., a "namespace creator" security role) from an appropriate IT staff member of the organization.

Starting with block 602, MCM system 102 can receive, from the workspace administrator, a request to create the new namespace in cluster 104 and to add the namespace to the administrator's workspace. This request can include information specifying a name for the new namespace and a name or identifier of the workspace.

In response, MCM system 102 can transmit a command to cluster 104 requesting creation of the namespace within the cluster (block 604). Upon receiving an acknowledgment from the cluster indicating that the namespace has been successfully created, MCM system 102 can add a node for the new namespace to the organization's workspace-enabled MCM data model 302 and establish a link from the workspace node to the new namespace node, thereby adding the namespace to the workspace (block 606).

Finally, at block 608, MCM system 102 can synchronize any namespace policies that have been set for the workspace to the newly added namespace. These polices can include, e.g., access policies specifying user-role bindings for members of the workspace administrator's development team, image policies for controlling which image repositories may be used to download container images to a namespace, and network policies for controlling what network traffic is allowed to flow into or out of applications deployed in a namespace. The specific manner in which the synchronization at block 608 can be performed with respect to access policies is discussed in the next section.

5. Setting an Access Policy on a Workspace

Figure 7:
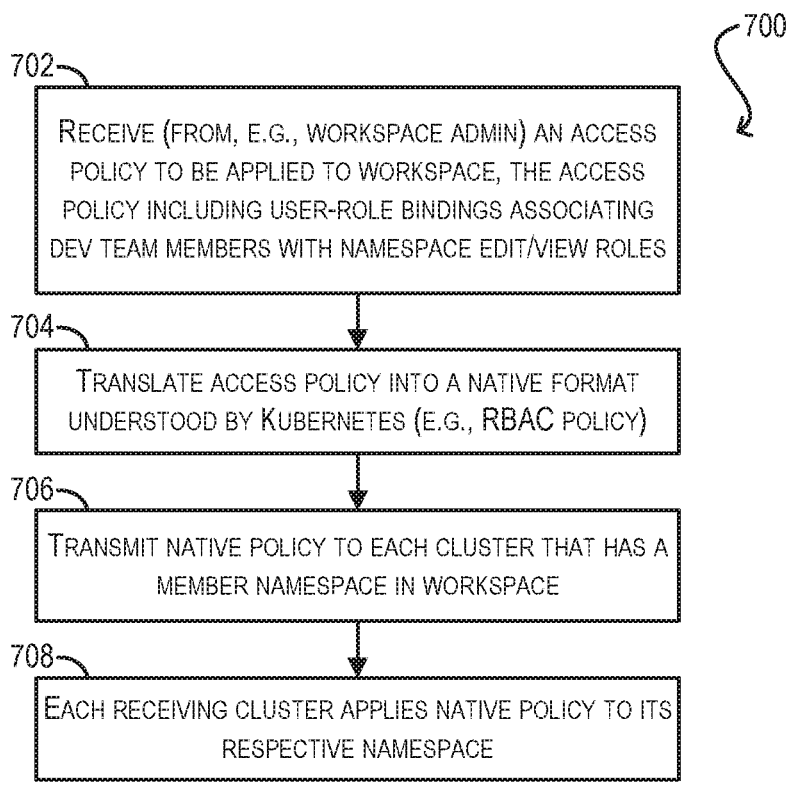
FIG. 7 depicts a workflow for setting an access policy on a workspace according to certain embodiments.

FIG. 7 depicts a workflow 700 that may be implemented by MCM system 102 of FIG. 3 for setting an access policy on a workspace according to certain embodiments. Workflow 700 assumes that a workspace administrator has been assigned to the workspace per workflow 500 of FIG. 5 and that one or more namespaces have been added to the workspace per workflow 600 of FIG. 6.

As used herein, an "access policy" is a collection of user-role bindings. Thus, by defining an access policy that includes bindings for associating development team members with "namespace view/edit" security roles and setting that access policy on a workspace, a workspace administrator can grant those development team members view/edit access to all of the member namespaces included the workspace (and thus allow those team members to, e.g., view and edit configuration settings within each namespace, deploy application objects to each namespace, and so on).

Starting with block 702, MCM system 102 can receive, from the workspace administrator, an access policy to be applied to the workspace, where the access policy includes user-role bindings as indicated above.

At blocks 704 and 706, MCM system 102 can synchronize the access policy to the member namespaces of the workspace by translating the access policy into a native format understood by Kubernetes (e.g., a role-based access control (RBAC) policy) and transmitting the native policy to each cluster of organization 106 that includes a member namespace of the workspace.

Finally, at block 708, each cluster that receives the native policy can apply the policy to its respective namespace and thereby cause the user-role bindings included in the policy to be activated on that namespace.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for managing namespaces in a multi-cluster management system, the method comprising:
    creating, by a computer system executing the multi-cluster management system, a workspace for an application being developed by a software development team of an organization, wherein the workspace is a logical grouping of namespaces on which the application has been or will be deployed, wherein each namespace provides a unique scope for resources and objects within a cluster, such that the resources and objects residing in said each namespace are not accessible from other namespaces, and wherein at least a subset of the namespaces in the workspace belong to different clusters of the organization, the different clusters corresponding to different sets of machines residing in different computing environments; and assigning, by the computer system, a member of the development team as a workspace administrator of the workspace, the assigning enabling the member of the development team to perform one or more management tasks on the workspace and the namespaces via the multi-cluster management system, wherein the one or more management tasks include a task for setting an access policy on the workspace, the access policy including at least one or more user-role bindings that enable one or more other members of the development team to access the namespaces in the workspace, and wherein, upon receiving the access policy from the workspace administrator, the computer system translates the access policy into a native format understood by the different clusters and transmits the translated policy to each of the different clusters.

2. The method of claim 1 wherein the one or more management tasks further include a task for creating a new namespace in a first cluster of the organization and adding the new namespace to the workspace.

3. The method of claim 2 wherein, upon adding the new namespace to the first cluster, the computer system automatically synchronizes namespace policies set on the workspace to the new namespace.

4. The method of claim 3 wherein the namespace policies include access policies, image policies, and network policies.

5. The method of claim 1 wherein the assigning of the member of the development team as the workspace administrator enables the member to perform the one or more management tasks without assistance from IT (information technology) staff of the organization.

6. A non-transitory computer readable storage medium having stored thereon program code executable by a computer system executing a multi-cluster management system, the program code embodying a method for managing namespaces in the multi-cluster management system, the method comprising:

creating a workspace for an application being developed by a software development team of an organization, wherein the workspace is a logical grouping of namespaces on which the application has been or will be deployed, wherein each namespace provides a unique scope for resources and objects within a cluster, such that the resources and objects residing in said each namespace are not accessible from other namespaces, and wherein at least a subset of the namespaces in the workspace belong to different clusters of the organization, the different clusters corresponding to different sets of machines residing in different computing environments; and assigning a member of the development team as a workspace administrator of the workspace, the assigning enabling the member of the development team to perform one or more management tasks on the workspace and the namespaces via the multi-cluster management system, wherein the one or more management tasks include a task for setting an access policy on the workspace, the access policy including at least one or more user-role bindings that enable one or more other members of the development team to access the namespaces in the workspace, and wherein, upon receiving the access policy from the workspace administrator, the computer system translates the access policy into a native format understood by the different clusters and transmits the translated policy to each of the different clusters.

7. The non-transitory computer readable storage medium of claim 6 wherein the one or more management tasks further include a task for creating a new namespace in a first cluster of the organization and adding the new namespace to the workspace.

8. The non-transitory computer readable storage medium of claim 7 wherein, upon adding the new namespace to the first cluster, the computer system automatically synchronizes namespace policies set on the workspace to the new namespace.

9. The non-transitory computer readable storage medium of claim 8 wherein the namespace policies include access policies, image policies, and network policies.

10. The non-transitory computer readable storage medium of claim 6 wherein the assigning of the member of the development team as the workspace administrator enables the member to perform the one or more management tasks without assistance from IT (information technology) staff of the organization.

11. A computer system executing a multi-cluster management system, the computer system comprising:

a processor; and a non-transitory computer readable medium having stored thereon program code that, when executed by the processor, causes the processor to:

create a workspace for an application being developed by a software development team of an organization, wherein the workspace is a logical grouping of namespaces on which the application has been or will be deployed, wherein each namespace provides a unique scope for resources and objects within a cluster, such that the resources and objects residing in said each namespace are not accessible from other namespaces, and wherein at least a subset of the namespaces in the workspace belong to different clusters of the organization, the different clusters corresponding to different sets of machines residing in different computing environments; and assign a member of the development team as a workspace administrator of the workspace, the assigning enabling the member of the development team to perform one or more management tasks on the workspace and the namespaces via the multi-cluster management system, wherein the one or more management tasks include a task for setting an access policy on the workspace, the access policy including at least one or more user-role bindings that enable one or more other members of the development team to access the namespaces in the workspace, and wherein, upon receiving the access policy from the workspace administrator, the computer system translates the access policy into a native format understood by the different clusters and transmits the translated policy to each of the different clusters.

12. The computer system of claim 11 wherein the one or more management tasks further include a task for creating a new namespace in a first cluster of the organization and adding the new namespace to the workspace.

13. The computer system of claim 12 wherein, upon adding the new namespace to the first cluster, the computer system automatically synchronizes namespace policies set on the workspace to the new namespace.

14. The computer system of claim 13 wherein the namespace policies include access policies, image policies, and network policies.

15. The computer system of claim 11 wherein the assigning of the member of the development team as the workspace administrator enables the member to perform the one or more management tasks without assistance from IT (information technology) staff of the organization.

\* \* \* \* \*